US009788381B2

(12) United States Patent
Dahlen et al.

(10) Patent No.: US 9,788,381 B2
(45) Date of Patent: Oct. 10, 2017

(54) HYBRID CLOSED LOOP DAYLIGHT HARVESTING CONTROL

(71) Applicant: KENALL MANUFACTURING COMPANY, Kenosha, WI (US)

(72) Inventors: Kevin Dahlen, Lindenhurst, IL (US); Jin Lee, Lake Villa, IL (US); Michael Gleason, McHenry, IL (US)

(73) Assignee: KENALL MANUFACTURING COMPANY, Kenosha, WI (US)

( * ) Notice: Subject to any disclaimer, the term of this patent is extended or adjusted under 35 U.S.C. 154(b) by 0 days.

(21) Appl. No.: 15/041,661

(22) Filed: Feb. 11, 2016

(65) Prior Publication Data

US 2017/0238387 A1    Aug. 17, 2017

(51) Int. Cl.
| | |
|---|---|
| H05B 37/02 | (2006.01) |
| H04N 5/225 | (2006.01) |
| H05B 33/08 | (2006.01) |
| H05B 39/04 | (2006.01) |
| H05B 41/392 | (2006.01) |
| H04N 7/18 | (2006.01) |

(52) U.S. Cl.
CPC ....... *H05B 33/0854* (2013.01); *H04N 5/2252* (2013.01); *H04N 7/18* (2013.01); *H05B 33/0851* (2013.01); *H05B 37/0272* (2013.01); *H05B 39/042* (2013.01); *H05B 39/044* (2013.01); *H05B 41/3921* (2013.01); *H05B 41/3922* (2013.01)

(58) Field of Classification Search
CPC ............ H05B 37/0218; H05B 37/0227; H05B 37/0272; H05B 33/0854; H05B 33/0845; H05B 37/02; H05B 37/0254; H05B 37/034; Y02B 20/46; Y02B 20/40; Y02B 20/44; Y02B 20/72; Y02B 70/3283; Y02B 90/2653; F21Y 2115/10; F21Y 2113/00
See application file for complete search history.

(56) References Cited

U.S. PATENT DOCUMENTS

| | | | |
|---|---|---|---|
| 7,391,297 B2 * | 6/2008 | Cash .................. | H05B 37/0272 315/318 |
| 7,922,354 B2 * | 4/2011 | Everhart ............... | F21V 23/009 362/234 |
| 8,344,660 B2 * | 1/2013 | Mohan ............... | H05B 37/0218 315/291 |
| 8,638,036 B2 * | 1/2014 | Delnoij .............. | H05B 37/0218 315/149 |
| 8,810,137 B2 | 8/2014 | Dahlen et al. | |
| 9,049,756 B2 * | 6/2015 | Klusmann .......... | H05B 37/0218 |
| 9,215,775 B1 * | 12/2015 | Lunn .................. | H05B 33/0854 |

(Continued)

*Primary Examiner* — Vibol Tan
(74) *Attorney, Agent, or Firm* — Marshall, Gerstein & Borun LLP; Randall G. Rueth (57) ABSTRACT

Embodiments are included for providing an energy efficient lighting system that includes one or several luminaires. According to certain aspects, when an area covered by the luminaires is vacant, the light level in the area is measured while the luminaires are on and set to a low dim level. The measured light level is used to approximate the amount of natural light in the area and when the measured light level exceeds a predetermined nonzero light level, the luminaires are turned off for a certain time period. Once the time period expires, the light level is measured again to approximate the amount of natural light present in the area.

17 Claims, 4 Drawing Sheets

(56) References Cited

U.S. PATENT DOCUMENTS

| | | | |
|---|---|---|---|
| 9,253,848 B2* | 2/2016 | Hayman | F21V 7/005 |
| 9,271,375 B2* | 2/2016 | Balasubramanian | H05B 37/02 |
| 9,288,875 B2* | 3/2016 | Billig | H05B 37/0218 |
| 9,565,741 B2* | 2/2017 | Carberry | H05B 37/02 |
| 2012/0229485 A1* | 9/2012 | Rhodes | G09G 5/246 |
| | | | 345/545 |
| 2013/0015783 A1* | 1/2013 | Herbst | H05B 37/0245 |
| | | | 315/297 |
| 2014/0285113 A1* | 9/2014 | Huang | H05B 37/0272 |
| | | | 315/297 |
| 2014/0293993 A1* | 10/2014 | Ryhorchuk | H04W 4/006 |
| | | | 370/350 |
| 2015/0022091 A1* | 1/2015 | Deixler | H05B 37/0218 |
| | | | 315/149 |
| 2015/0123563 A1* | 5/2015 | Dahlen | H05B 37/0272 |
| | | | 315/294 |
| 2015/0254570 A1* | 9/2015 | Florence | G06N 7/005 |
| | | | 706/52 |
| 2017/0094134 A1* | 3/2017 | Lunn | H04L 12/282 |

* cited by examiner

HYBRID CLOSED LOOP DAYLIGHT HARVESTING CONTROL

FIELD

The present disclosure generally relates to energy efficient lighting systems and, more particularly to measuring an amount of light present in an area covered by the lighting system and dimming the lights accordingly.

BACKGROUND

Most commercial buildings, parking structures, transportation areas or structures, and the like are equipped with lighting systems that typically include several luminaires or light fixtures. It is an area of interest in the lighting industry to provide lighting systems having energy saving features. Current legislation demands that light fixtures be controlled when they are not in use by either lowering light levels or completely shutting off power to unneeded or redundant artificial light. However, current detection systems have difficulty distinguishing between artificial and natural light. As a result, lighting systems may have to shut off the power to the light fixtures completely to measure the amount of natural light. This may be dangerous when the lighting system is in a parking garage for example, and the amount of natural light is insufficient for the occupants.

SUMMARY

To provide energy efficient lighting, a lighting system may measure the light level within an area covered by the lighting system when the luminaires are set to a predetermined dim level (e.g., 20%). The measured light level when the luminaires are set to the predetermined dim level may be approximated as the amount of natural light. If the light level exceeds a threshold amount (e.g., 5 foot-candles (ft-c), 10 ft-c, etc.), the lighting system may determine that light from the luminaires is unneeded and the lighting system may shut off the power to the luminaires. As a result, the lighting system may measure the light level within an area without shutting off the power to the luminaires during the measurement.

The lighting system include several luminaires each having a light emitting diode (LED) module for providing light, an occupancy sensor for detecting motion within the area covered by the luminaire, and a light level sensor to measure the amount of light within the area. Additionally, the lighting system may include a control module within an electronic device, for example, to adjust the power input to each of the luminaires by varying the duty cycle of the voltage corresponding to different levels of light output. The control module may turn on the power to the luminaires to full power when occupancy is detected within the area, and may provide a reduced power input when the area is vacant to dim the luminaires and measure the light level.

If the light level exceeds a threshold amount (e.g., 5 ft-c, 10 ft-c, etc.), the control module may shut off the power to the luminaires for a predetermined amount of time (e.g., 20 minutes). On the other hand, if the light level is at or below the threshold amount, the control module may set the power input to dim the luminaires for the predetermined amount of time to a predetermined dim level (e.g., 10%, 20%, 30%, 50%, etc.) set by a user for example. When the predetermined amount of time expires and when the area is vacant, the control module may provide the reduced power input and the light level is measured once again to approximate the amount of natural light within the area.

In an embodiment, a computer-implemented method for providing energy efficient lighting is provided. The method includes receiving from one or more occupancy sensors in one or more light emitting diode (LED) based luminaires corresponding to an area, an indication that the area is unoccupied. The method further includes reducing an amount of power provided to the one or more LED based luminaires to a predetermined nonzero amount, receiving from one or more light level sensors in the one or more LED based luminaires, a light level measurement for the area when the power provided to the one or more LED based luminaires is at the predetermined nonzero amount of power, and when the light level measurement is above a predetermined nonzero light level, turning off the power provided to the one or more LED based luminaires for a predetermined amount of time.

In another embodiment, a system for providing energy efficient lighting is provided. The system includes one or more light emitting diode (LED) based luminaires each including an occupancy sensor to monitor whether an area corresponding to the LED based luminaire is occupied and a light level sensor to measure the light level for the area. The lighting system also includes an electronic device. The electronic device includes a communication network, one or more processors coupled to the communication network, and a non-transitory computer-readable memory coupled to the one or more processors and storing instructions thereon. The instructions, when executed by the one or more processors, cause the electronic device to receive, via the communication network from the one or more occupancy sensors in the one or more (LED) based luminaires, an indication that the area is unoccupied and reduce, via the communication network, an amount of power provided to the one or more LED based luminaires to a predetermined nonzero amount. The instructions further cause the electronic device to receive, via the communication network from the one or more light level sensors in the one or more LED based luminaires, a light level measurement for the area when the power provided to the one or more LED based luminaires is at the predetermined nonzero amount of power, and when the light level measurement is above a predetermined nonzero light level, turn off, via the communication network, the power provided to the one or more LED based luminaires for a predetermined amount of time.

In yet another embodiment, an electronic device for providing efficient lighting is provided. The electronic device includes a communication network, one or more processors coupled to the communication network, and a non-transitory computer-readable memory coupled to the one or more processors and storing instructions thereon. The instructions, when executed by the one or more processors, cause the electronic device to receive, via the communication network from one or more occupancy sensors in one or more (LED) based luminaires corresponding to an area, an indication that the area is unoccupied and reduce, via the communication network, an amount of power provided to the one or more LED based luminaires to a predetermined nonzero amount. The instructions further cause the electronic device to receive, via the communication network from the one or more light level sensors in the one or more LED based luminaires, a light level measurement for the area when the power provided to the one or more LED based luminaires is at the predetermined nonzero amount of power and when the light level measurement is above a predetermined nonzero light level, turn off, via the communication network, the power provided to the one or more LED based luminaires for a predetermined amount of time.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Generally speaking, techniques for providing energy efficient lighting may be implemented in one or several luminaires, an electronic device for controlling the luminaires, or a system that includes a combination of these. However, for clarity, the examples below focus primarily on an embodiment in which the luminaires detect occupancy and measure light levels within an area covered by the luminaires. As mentioned above, the lighting system may be included in a commercial building, parking structure, transportation area, etc. The area covered by the luminaires may be a floor of the commercial building or parking garage, or may be a portion of the floor of the commercial building or parking garage that receives light from the luminaire. In any event, the electronic device may control the amount of power provided to the luminaires and may direct the luminaires to detect occupancy and/or measure light levels. Based on the occupancy and/or light level, the electronic device may alter the amount of power provided to the luminaires.

The systems and methods as discussed herein offer numerous advantages over existing lighting systems. In particular, by measuring light levels when the luminaires are at a predetermined dim level, the lighting system can provide sufficient lighting to occupants, thereby avoiding the dangers associated with shutting off the power to the luminaires when the light level in the area is unknown or the most recent light level measurement is outdated. Additionally, by determining the amount of natural light present in an area, the lighting system may shut off the power to the luminaires when artificial light is unnecessary, thereby reducing energy consumption. It should be appreciated that additional advantages and benefits are envisioned.

Figure 1:
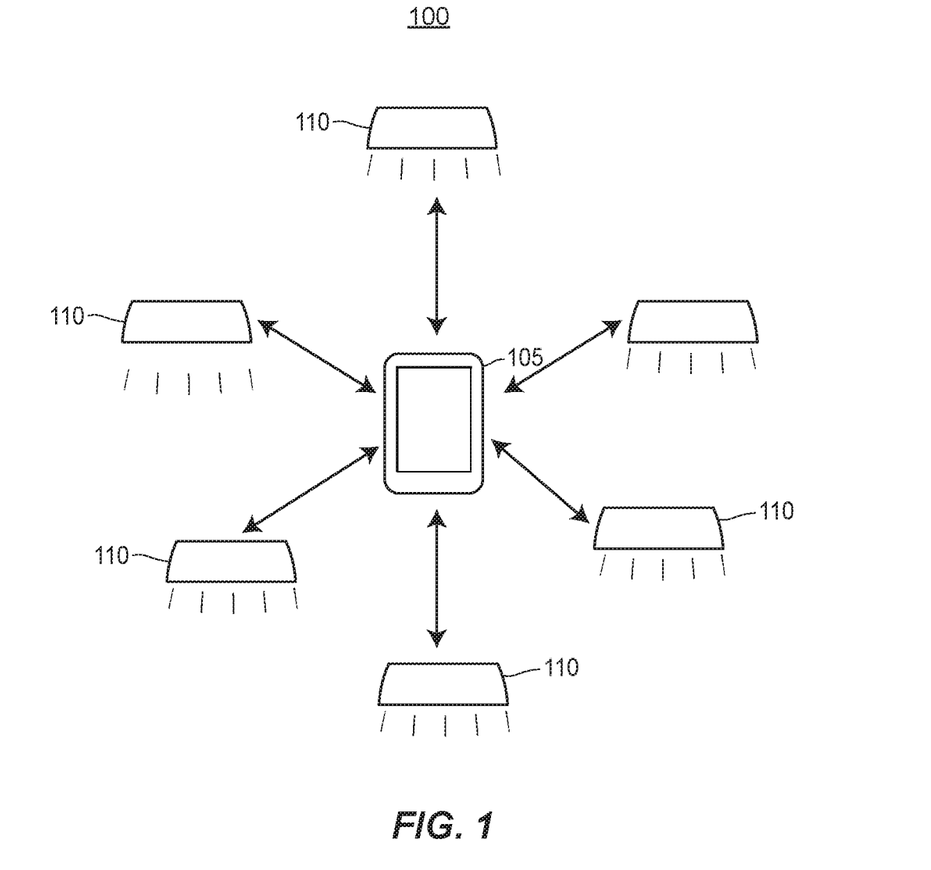
FIG. 1 depicts an example representation of an environment and components thereof for providing an energy efficient lighting system.

FIG. 1 is an example representation of an environment 100 and components thereof for providing an energy efficient lighting system. As shown in FIG. 1, the environment 100 includes an electronic device 105 and a plurality of luminaires 110. The electronic device 105 may be, for example, a handheld wireless device, a mobile phone, a Personal Digital Assistant (PDA), a smart phone, a wearable computing device, a tablet or laptop computer, a desktop computer, a multimedia player, an MP3 player, a digital broadcast receiver, a remote controller, or any other electronic apparatus. Each of the plurality of luminaires 110 may be any type of light fixture, light fitting, or other device used to create light by use of an electric lamp, and may include a fixture body and a light socket to hold the lamp and allow for a replacement lamp. It should be appreciated that the plurality of luminaires 110 need not be uniform (i.e., the plurality of luminaires 110 can be of different types, sizes, model numbers, etc.). According to some embodiments, the plurality of luminaires 110 can collectively be associated with a lighting system or a portion thereof. For example, the lighting system can be included in a parking garage (or a floor or section of the parking garage), commercial building (or a portion thereof), roadway or other transportation structure (or a portion thereof), residential home or building, or other indoor or outdoor space or environment. Although not shown in FIG. 1, it should be appreciated that the plurality of luminaires 110 may connect to each other via a wired or wireless connection (such as to form a mesh network). Further, it should be appreciated that the plurality of luminaires 110 may connect to and, once commissioned, be controlled by a central controller or similar device or component.

According to some embodiments, the electronic device 105 can be configured to control one or several of the luminaires 110. In some embodiments, the electronic device 105 may communicate (e.g., using one or more communication modules) with each of the plurality of luminaires 110 via a short range communication to retrieve various data and/or control the power input to the luminaires 110. In some embodiments, the short range communication can be radio-frequency identification (RFID), Bluetooth®, Bluetooth® low energy (BLE), Infrared Data Association (IrDA), near field communication (NFC), ZigBee, other protocols defined under the IEEE 802 standard, and/or other technologies.

Each luminaire 110 may include an LED module, an occupancy sensor, a light level sensor (also referred to herein as a "daylight sensor"), and a communication module for communicating with the electronic device 105 and/or other luminaires 110. The light level measured by the light level sensor may be an amount of visible light present in a given area, such as the area covered by the luminaires 110. The light level may be measured in foot-candles, lux, lumens per square meter, or any other suitable units of measurement.

In some embodiments, the electronic device 105 may include a control module for controlling one or several of the luminaires 110, such as for example, turning the luminaires 110 on and off, adjusting the dim level for the luminaires 110 by providing various power inputs, causing the luminaires 110 to provide light level measurements and to detect occupancy, etc. The electronic device 105 may also include one or several user controls which may allow a user to adjust the settings in the control module. For example, the electronic device 105 may include buttons which allow a user to set the dim level for the luminaires 110, turn the luminaires 110 on and off, set timers for determining when to receive data from the light level sensors, etc.

While one electronic device 105 is shown in FIG. 1 for controlling each of the luminaires 110 this is merely one exemplary embodiment. In other embodiments, several electronic devices 105 may be utilized to control the luminaires, such that for example each electronic device 105 controls a single luminaire 110, or each electronic device 105 controls a suitable number of luminaires 110.

Figure 2:
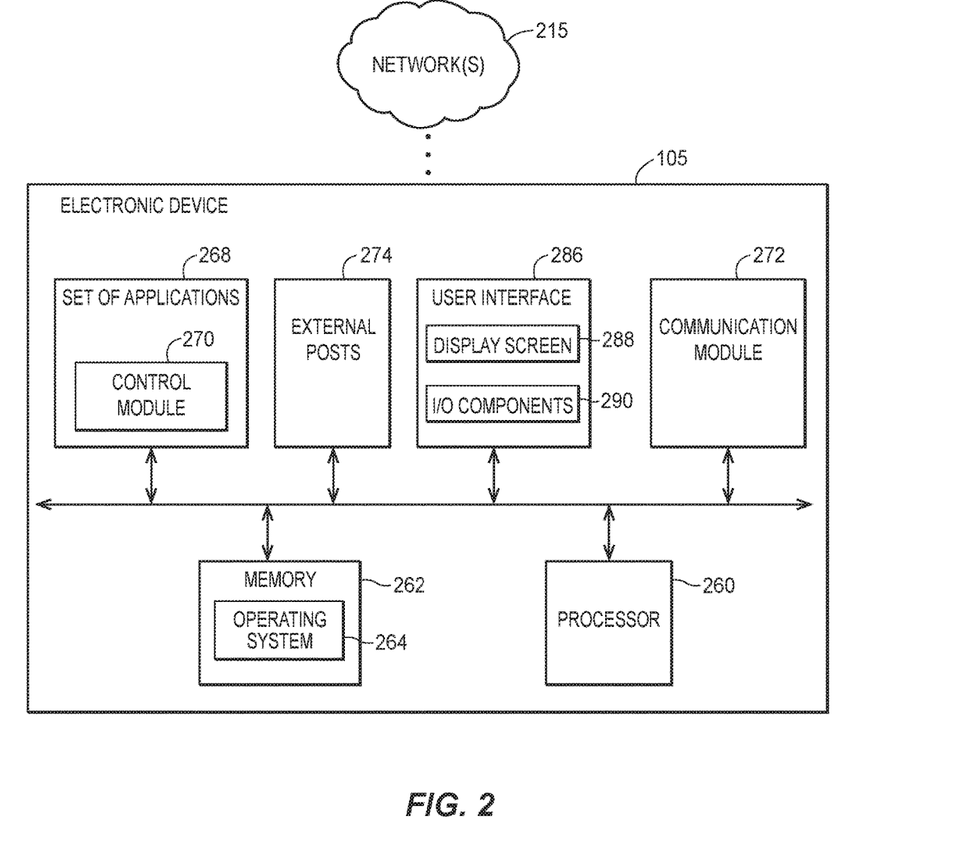
FIG. 2 depicts an example block diagram of an electronic device in accordance with some embodiments.

Turning now to FIG. 2, the electronic device 105 may include a processor 260, or other similar type of controller or microcontroller, as well as a memory 262 which may store an operating system 264. The operating system 264, for example, may include Microsoft Windows®, OS X®, Linux®, Unix®, etc. In some embodiments, the electronic device 105 may also include, or otherwise be communicatively connected to, a database or other data storage mechanism (e.g., one or more hard disk drives, optical storage drives, solid state storage devices, etc.). The processor 260 may interface with the memory 262 to execute the operating system 264 as well as execute a set of application 268 such as the control module 270 (which the memory 262 can also store). The memory 262 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 105 may further include a communication module 272 configured to interface with one or more external ports 274 to communicate data via one or more networks 215. For example, the communication module 272 can leverage the external ports 274 to establish a BLE connection for connecting the electronic device 105 to other devices such as one or several luminaires 110. In some embodiments, the communication module 272 can include components that enable short range communication with other devices (e.g., luminaires), such as RFID components, NFC components, Bluetooth® components, and/or the like.

Additionally, the electronic device 105 may include a user interface 286 for presenting information to the user and/or receiving inputs from the user. The user interface 286 may include a display screen 288 and I/O components 290 (e.g., capacitive or resistive touch sensitive input panels, keys, buttons, lights, LEDs, cursor control devices, haptic devices, and others). In some embodiments, the display screen 288 is a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like.

For example, the I/O components 290 in the user interface 286 may include one or several buttons which when selected by the user, adjust settings in the control module 270. More specifically, a first set of buttons may be included for setting the dim level for the luminaires 110 when the measured amount of light does not exceed a predetermined nonzero light level (e.g., 5 ft-c, 10 ft-c, etc.). For example, the first set of buttons may include a button for setting the dim level to 10 percent, a button for setting the dim level to 20 percent, a button for setting the dim level to 30 percent, a button for setting the dim level to 50 percent, etc. In other embodiments, the first set of buttons may be one button where the dim level is adjusted based on the number of button presses.

Moreover, a second set of buttons may be included for setting a timer corresponding to a length of time in between light level measurements. When the light level is measured, the power to the luminaires 110 is adjusted for a predetermined amount of time corresponding to the timer setting. When the predetermined amount of time expires, the light level is measured again and the power re-adjusted. For example, the second set of buttons may include a button for setting the timer to 30 seconds, a button for setting the timer to 1 minute, a button for setting the timer to 5 minutes, a button for setting the timer to 10 minutes, a button for setting the timer to 20 minutes, a button for setting the timer to 30 minutes, etc. In other embodiments, the second set of buttons may be one button where the timer is adjusted based on the number of button presses.

Furthermore, a third set of buttons may be included for setting the predetermined nonzero light level which is compared to the measured amount of light to determine whether to shut off power to the luminaires 110. For example, the third set of buttons may include a button for setting the light level to 5 ft-c, a button for setting the light level to 10 ft-c, etc. In other embodiments, the third set of buttons may be one button where the lighting is adjusted based on the number of button presses. Additional or alternative sets of buttons may also be included for adjusting various settings in the control module 270, such as a set of button for adjusting the sensitivity in the occupancy sensor, a set of buttons for turning the power to the luminaires permanently on or off, a set of test buttons, etc.

Also in some embodiments, sets of buttons may be included for adjusting a combination of settings in the control module 270. For example, a button may be included which when selected, may set the dim level for the luminaires 110 to 30 percent, set the timer to 20 minutes, and set the light level to 5 ft-c. In another embodiment, capacitive or resistive touch sensitive input panels presented on the display screen 288 may cause the settings in the control module 270 to be adjusted when selected by the user.

Each of these user-specified settings may be obtained by the control module 270. The control module 270 may then transmit control signals to the luminaires 110 based on the user-specified settings and/or based on default thresholds or settings obtained by the control module 270. For example, the control module 270 may turn on the power to the luminaires 110 and cause the luminaires 110 to detect occupancy. If occupancy is detected, the luminaires 110 may continue to be powered on. On the other hand, if occupancy is not detected, the control module 270 may reduce the power to the luminaires 110 to a predetermined amount (e.g., 20%) and the luminaires 110 may wait a predetermined period (e.g., 10 seconds) allowing the dim level from the luminaires 110 to match the reduced power input before measuring the light level.

After the predetermined period expires, the control module 270 may receive the light level measurement from the luminaires 110 and compare the measurement to a predetermined nonzero light level (e.g., 5 ft-c, 10 ft-c, etc.) specified by the user or included in the control module 270. When the light level measurement exceeds the predetermined nonzero amount, the control module 270 may shut off the power to the luminaires for a predetermined amount of time (e.g., 30 seconds, 1 minutes, 10 minutes, 20 minutes, 30 minutes, etc.) specified by the user or included in the control module 270. On the other hand, when the light level measurement does not exceed the predetermined nonzero amount, the control module 270 may set the power corresponding to a dim level (e.g., 10 percent, 20 percent, 30 percent, 50 percent, etc.) for the luminaires which is specified by the user or included in the control module 270. After the predetermined amount of time expires, the light level is measured again and the process is repeated.

Figure 3:
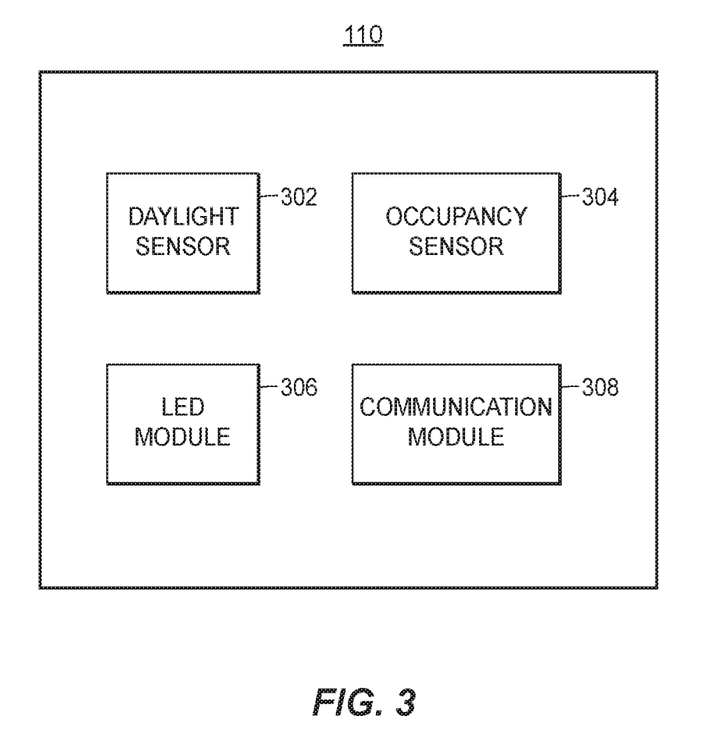
FIG. 3 depicts an example block diagram of a luminaire in accordance with some embodiments.

FIG. 3 illustrates an example luminaire 110 which may include a daylight sensor 302 (light level sensor), an occupancy sensor 304, an LED module 306, and a communication module 308. The daylight sensor 302 may be a photodiode or any other suitable photodetector which measures the light level in an area covered by the luminaire 110 including background light, ambient light, daylight, sunlight, etc. In some embodiments, the daylight sensor 302 may continuously measure the light level in the area. In other embodiments, the daylight sensor 302 may measure the light level upon receiving a request from the electronic device 105.

The occupancy sensor 304 may be an infrared (IR) motion sensor, ultrasonic sensor, microwave sensor, or any other suitable sensor to detect motion in the area covered by the luminaire. Occupancy may be identified when motion is detected and vacancy may be identified when no motion is detected for a predetermined amount of time (e.g., 10 seconds, 20 seconds, a minutes, etc.). In some embodiments, the occupancy sensor 304 may continuously monitor the area to determine whether the area is occupied or vacant. In other embodiments, the occupancy sensor 304 may detect occupancy upon receiving a request from the electronic device 105. Also in some embodiments, a composite sensor may include a combination of the functionality of the daylight sensor 302 and the occupancy sensor 304 in a single sensor.

The LED module 306 may include one or several LED light bulbs and one or several light sockets to hold the one or several LED light bulbs. For example, the LED module 306 may include an array of LED light bulbs or a single LED light bulb. Additionally, the LED module 306 may be connected to a power supply and may include an electronic switch to open and close the connection between the LED module 306 and the power supply.

The communication module 308 is similar to the communication module 272 in the electronic device 105 and may communicate data via one or more networks. For example, the communication module 308 can establish a BLE connection for connecting the luminaire to other devices such as the electronic device 105. The communication module 306 may communicate data detected by the daylight sensor 302 (e.g., a measured light level) and the occupancy sensor 304 (e.g., occupancy or vacancy) to the electronic device 105. Additionally, the communication module 308 may receive data from the electronic device 105, such as requests to measure the light level or detect occupancy and may receive a power input from the electronic device 105. In some embodiments, the communication module 306 can include components that enable short range communication with other devices (e.g., the electronic device 105), such as RFID components, NFC components, Bluetooth® components, and/or the like.

In some embodiments, the control module 270 in the electronic device 105 as shown in FIG. 2 may control the amount of power provided to the LED light bulbs in the LED module 306. For example, to turn the power on, the control module 270 may transmit a control signal to the luminaires 110 to close the electronic switch connecting the power supply to the LED module 306. To turn the power off, the control module 270 may transmit a control signal to the luminaires 110 to open the electronic switch disconnecting the power supply from the LED module 306. To set the power to an intermediate state, for example corresponding to a dim level of 10 percent, 20 percent, 30 percent, 50 percent etc., the control module 270 may transmit a control signal to the luminaires 110 to open and close the electronic switch repeatedly at a high frequency (e.g., 120 Hz, 1 kHz, 5 kHz, 100 kHz, etc.) according to a duty cycle using pulse-width modulation techniques. The dim level is then determined based on the effective pulse width of the on state (closed switch) relative to the off state (open switch). For example, to set the dim level to 50 percent, the control signal may include a duty cycle of 50 percent. In other embodiments, the control module 270 may transmit a control signal to adjust the amount of current supplied to the luminaires 110 and different amounts of current may correspond to different dim levels.

Figure 4:
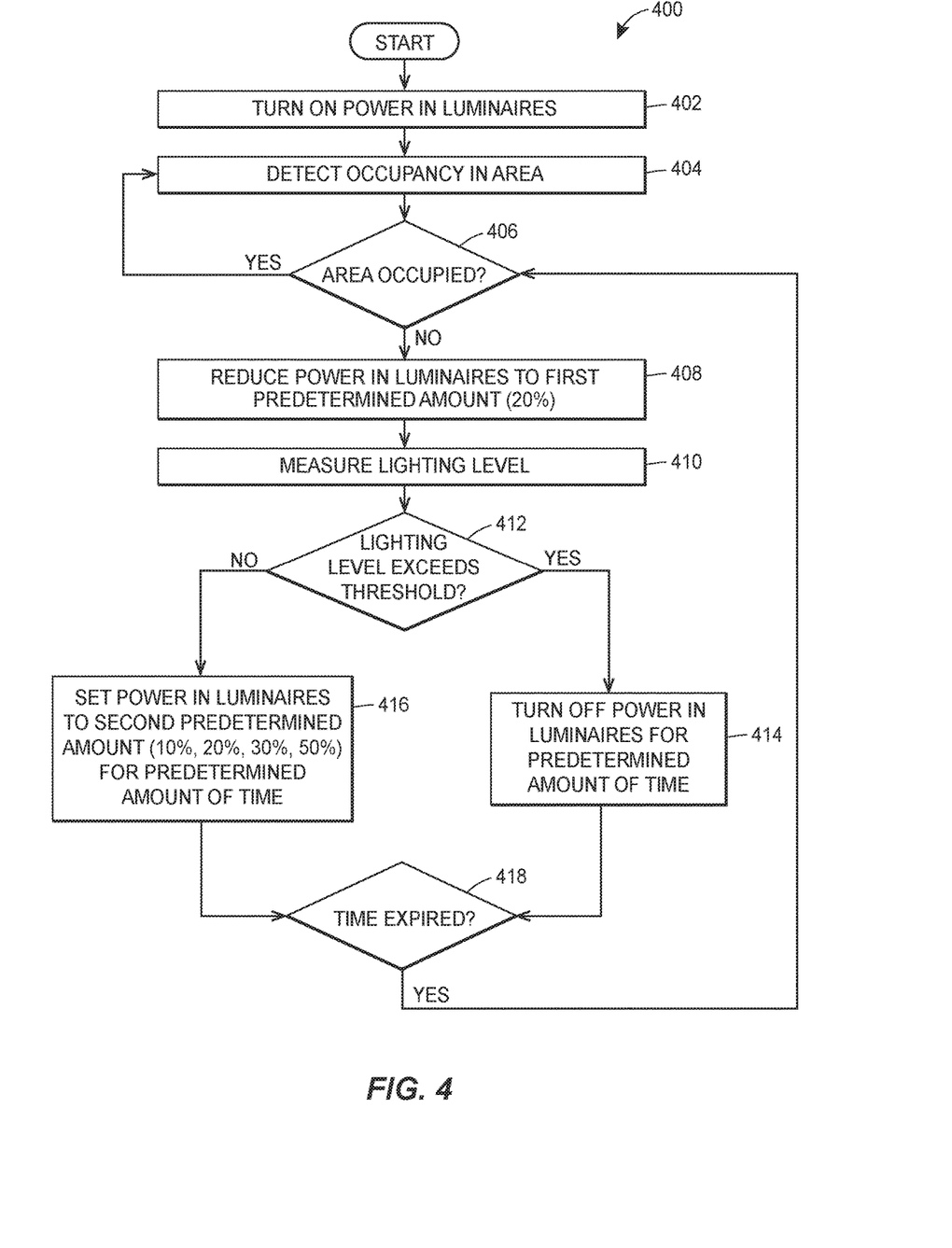
FIG. 4 depicts a flow diagram representing an exemplary method in an electronic device for providing energy efficient lighting in accordance with some embodiments

FIG. 4 depicts a flow diagram representing an exemplary method 400 for providing energy efficient lighting. The method 400 may be executed on the electronic device 105. In some embodiments, the method 400 may be implemented in a set of instructions stored on a non-transitory computer-readable memory and executable on one or more processors of the electronic device 105. For example, the method 400 may be performed by the control module 270 of FIG. 2.

At block 402, the electronic device 105 may turn on the power to the luminaires 110. For example, as mentioned above, the control module 270 may transmit a control signal to the luminaires 110 to close the electronic switch connecting the power supply to the LED module 306. The electronic device 105 may also provide a request to the occupancy sensors 304 to detect occupancy in the area covered by the luminaires 110 (block 404), and in turn may receive an indication of occupancy or vacancy from the occupancy sensor 304.

If the area is occupied, the electronic device may continue to receive indications of occupancy or vacancy from the occupancy sensor 304 until the area is vacant. When the area is vacant, the electronic device 105 may reduce the power to the luminaires 110 to a predetermined nonzero amount for measuring the light level (block 408). To reduce the power, the control module 270 may for example, transmit a control signal to the luminaires 110 to open and close the electronic switch repeatedly at a high frequency according to a duty cycle using pulse-width modulation techniques. The predetermined nonzero amount may correspond to a dim level (e.g., 20%) and may be included as a default setting in the control module 270, in a database, or any other suitable location. The predetermined nonzero amount may be selected so that the luminaires 110 can approximate the amount of natural light by measuring the light level while the luminaires 110 are still on and set to the dim level corresponding to the predetermined nonzero amount.

After the power to the luminaires 110 is reduced to the predetermined nonzero amount, the electronic device 105 may wait a predetermined period for the luminaires 110 to reach the desired dim level. For example, it may take 10 seconds for the luminaires 110 to adjust from 100 percent to 20 percent dim level after the power is reduced from 100 percent to 20 percent. The predetermined period may be included as a default setting in the control module 270, in a database, or any other suitable location.

After the predetermined period (e.g., 10 seconds) expires, the electronic device 105 may once again receive an indication of occupancy or vacancy from the occupancy sensor 304. If the area is occupied, the luminaires 110 may be reset to full power and the process repeated. If the area is still vacant, the electronic device 105 may provide a request to the daylight sensor 302 to measure the light level in the area covered by the luminaires 110 (block 410), and in turn may receive a light level measurement from the daylight sensor 302. The electronic device 105 may then compare the light level measurement to a predetermined nonzero light level (e.g., 5 ft-c, 10 ft-c, etc.). The predetermined nonzero light level may be included as a default setting in the control module 270, may be specified by the user via the buttons and/or touch sensitive input panels presented on the display screen 288 of the electronic device 105 as shown in FIG. 2, or may be determined in any other suitable manner.

If the light level measurement exceeds the predetermined nonzero light level, the electronic device 105 may turn off the power to the luminaires for a predetermined amount of time (e.g., 30 seconds, 1 minute, 5 minutes, 10 minutes, 20 minutes, 30 minutes, etc.) (block 414). To turn off the power, the control module 270 may for example, transmit a control signal to the luminaires 110 to open the electronic switch disconnecting the power supply from the LED module 306. During the predetermined amount of time, the natural light may provide sufficient lighting to the area covered by the luminaires 110. The predetermined amount of time may be included as a default setting in the control module 270, may be specified by the user via the buttons and/or touch sensitive input panels presented on the display screen 288 of the electronic device 105 as shown in FIG. 2, or may be determined in any other suitable manner.

On the other hand, if the light level measurement is at or below the predetermined nonzero light level, the electronic device 105 may set the power to the luminaires 110 to another predetermined nonzero amount (e.g., 10 percent, 20 percent, 30 percent, 50 percent, etc.) for the predetermined amount of time (block 416). The other predetermined nonzero amount may correspond to a second dim level which may be the same as or different from the dim level used when the light level is measured. The second dim level may be included as a default setting in the control module 270, may be specified by the user via the buttons and/or touch sensitive input panels presented on the display screen 288 of the electronic device 105 as shown in FIG. 2, or may be determined in any other suitable manner.

In some embodiments, the second dim level may be determined based on the measured light level and/or the predetermined nonzero light level. The second dim level may decrease as the measured light level approaches the predetermined nonzero light level. For example, when the measured light level is very close to the predetermined nonzero light level (e.g., the measured light level is 9 ft-c and the predetermined nonzero light level is 10 ft-c), the second dim level may be low (e.g., 10 percent) and when the measured light level is significantly less than the predetermined nonzero light level (e.g., the measured light level is 1 ft-c and the predetermined nonzero light level is 10 ft-c), the second dim level may be high (e.g., 50 percent).

In any event, when the predetermined amount of time expires (block 418), the process may be repeated to once again measure the light level and approximate the amount of natural light. This measurement occurs periodically to account for changes in the amount of natural light over the course of a day. For example, in the morning on a sunny day there may be enough natural light to light up a parking garage without needing to turn on the luminaires 110. However, the sky may be overcast in the afternoon and there may be insufficient lighting to the parking garage from natural light. As a result, the luminaires 110 may be turned on and set to a dim level specified by a user or included in the default settings. The sun may come out once again just before dusk which may cause the luminaires 110 to be turned off for a short duration until the sun goes down and artificial light becomes necessary.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a stand alone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The invention claimed is:

1. A computer-implemented method for providing energy efficient lighting, the method executed by one or more processors programmed to perform the method, the method comprising:

receiving, at one or more processors from one or more occupancy sensors in one or more light emitting diode (LED) based luminaires corresponding to an area, an indication that the area is unoccupied;

reducing, by the one or more processors, an amount of power provided to the one or more LED based luminaires to a first predetermined nonzero amount;

receiving, at the one or more processors from one or more light level sensors in the one or more LED based luminaires, a light level measurement for the area when the power provided to the one or more LED based luminaires is at the first predetermined nonzero amount of power; and when the light level measurement is above a predetermined nonzero light level, turning off, by the one or more processors, the power provided to the one or more LED based luminaires for a predetermined amount of time; and when the light level measurement is at or below the predetermined nonzero light level, setting, by the one or more processors, the power provided to the one or more LED based luminaires to a second predetermined nonzero amount of power for the predetermined amount of time.

2. The method of claim 1, further comprising continuously monitoring, by the one or more processors via the one or more occupancy sensors, the area to determine whether the area is occupied.

3. The method of claim 1, further comprising:

receiving, at the one or more processors from the one or more occupancy sensors, an indication that the area is occupied; and setting, by the one or more processors, the power provided to the one or more LED based luminaires to full power until the area is no longer occupied.

4. The method of claim 3, wherein setting the power provided to the one or more LED based luminaires including adjusting, by the one or more processors, a duty cycle in a voltage level provided to the one or more LED based luminaires.

5. The method of claim 1, wherein the light level measurement is a first light level measurement and when the predetermined amount of time passes, the method further comprises:
setting, by the one or more processors, the amount of power provided to the one or more LED based luminaires to the predetermined nonzero amount; and
receiving, at the one or more processors from the one or more light level sensors, a second light level measurement for the area when the power provided to the one or more LED based luminaires is at the predetermined nonzero amount of power.

6. The method of claim 1, wherein at least one of: (i) the predetermined nonzero light level, (ii) the predetermined amount of time, or (iii) the second predetermined nonzero amount of power is set by a user via one or more user controls communicatively coupled to the one or more processors.

7. The method of claim 1, wherein the predetermined amount of time is a first predetermined amount of time and the light level measurement is received at the one or more processors a second predetermined amount of time after the amount of power provided to the one or more LED based luminaires is reduced to the predetermined nonzero amount.

8. A system for providing energy efficient lighting comprising:
one or more light emitting diode (LED) based luminaires each including an occupancy sensor to monitor whether an area corresponding to the LED based luminaire is occupied and a light level sensor to measure the light level for the area; and
an electronic device including:
a communication network;
one or more processors coupled to the communication network; and
a non-transitory computer-readable memory coupled to the one or more processors and storing instructions thereon that, when executed by the one or more processors, cause the electronic device to:
receive, via the communication network from the one or more occupancy sensors in the one or more (LED) based luminaires, an indication that the area is unoccupied;
reduce, via the communication network, an amount of power provided to the one or more LED based luminaires to a first predetermined nonzero amount;
receive, via the communication network from the one or more light level sensors in the one or more LED based luminaires, a light level measurement for the area when the power provided to the one or more LED based luminaires is at the first predetermined nonzero amount of power; and
when the light level measurement is above a predetermined nonzero light level, turn off, via the communication network, the power provided to the one or more LED based luminaires for a predetermined amount of time; and
when the light level measurement is at or below the predetermined nonzero light level, set the power provided to the one or more LED based luminaires to a second predetermined nonzero amount of power for the predetermined amount of time.

9. The system of claim 8, wherein the instructions further cause the electronic device to:

receive, via the communication network from the one or more occupancy sensors, an indication that the area is occupied; and
set, via the communication network, the power provided to the one or more LED based luminaires to full power until the area is no longer occupied.

10. The system of claim 8, wherein the light level measurement is a first light level measurement and when the predetermined amount of time passes, the instructions further cause the electronic device to:
set the amount of power provided to the one or more LED based luminaires to the predetermined nonzero amount; and
receive, via the communication network from the one or more light level sensors, a second light level measurement for the area when the power provided to the one or more LED based luminaires is at the predetermined nonzero amount of power.

11. The system of claim 8, wherein the electronic device further includes one or more user controls for setting at least one of: (i) the predetermined nonzero light level, (ii) the predetermined amount of time, or (iii) the second predetermined nonzero amount of power.

12. The system of claim 8, wherein the predetermined amount of time is a first predetermined amount of time and the light level measurement is received a second predetermined amount of time after the amount of power provided to the one or more LED based luminaires is reduced to the predetermined nonzero amount.

13. The system of claim 8, wherein monitoring the area by the occupancy sensors includes continuously measuring an occupancy level for the area and transmitting the occupancy levels to the electronic device; and
to receive an indication that the area is unoccupied, the instructions cause the electronic device to:
receive a plurality of occupancy level measurements from the occupancy sensors; and
analyze the plurality of occupancy level measurements to detect that the area is unoccupied.

14. An electronic device for providing efficient lighting comprising:
a communication network;
one or more processors coupled to the communication network; and
a non-transitory computer-readable memory coupled to the one or more processors and storing instructions thereon that, when executed by the one or more processors, cause the electronic device to:
receive, via the communication network from one or more occupancy sensors in one or more (LED) based luminaires corresponding to an area, an indication that the area is unoccupied;
reduce, via the communication network, an amount of power provided to the one or more LED based luminaires to a first predetermined nonzero amount;
receive, via the communication network from the one or more light level sensors in the one or more LED based luminaires, a light level measurement for the area when the power provided to the one or more LED based luminaires is at the first predetermined nonzero amount of power; and
when the light level measurement is above a predetermined nonzero light level, turn off, via the communication network, the power provided to the one or more LED based luminaires for a predetermined amount of time; and when the light level measurement is at or below the predetermined nonzero light level, set the power provided to the one or more LED based luminaires to a second predetermined nonzero amount of power for the predetermined amount of time.

15. The electronic device of claim 14, wherein the instructions further cause the electronic device to:
receive, via the communication network from the one or more occupancy sensors, an indication that the area is occupied; and
set, via the communication network, the power provided to the one or more LED based luminaires to a maximum amount until the area is no longer occupied.

16. The electronic device of claim 14, further including one or more user controls for setting at least one of: (i) the predetermined nonzero light level, (ii) the predetermined amount of time, or (iii) the second predetermined nonzero amount of power.

17. The electronic device of claim 14, wherein the predetermined amount of time is a first predetermined amount of time and the light level measurement is received a second predetermined amount of time after the amount of power provided to the one or more LED based luminaires is reduced to the predetermined nonzero amount.

* * * * *